(12) United States Patent
Yoo et al.

(10) Patent No.: US 11,744,228 B2
(45) Date of Patent: Sep. 5, 2023

(54) WATER SUPPLY DEVICE FOR PETS

(71) Applicant: LG ELECTRONICS INC., Seoul (KR)

(72) Inventors: Hyunsun Yoo, Seoul (KR); Sungkyung Kim, Seoul (KR); Joogyeom Kim, Seoul (KR); Yousook Eun, Seoul (KR); Jaehung Chun, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 256 days.

(21) Appl. No.: 17/277,891

(22) PCT Filed: Sep. 19, 2019

(86) PCT No.: PCT/KR2019/012182
§ 371 (c)(1),
(2) Date: Mar. 19, 2021

(87) PCT Pub. No.: WO2020/060250
PCT Pub. Date: Mar. 26, 2020

(65) Prior Publication Data
US 2021/0345580 A1   Nov. 11, 2021

Related U.S. Application Data

(60) Provisional application No. 62/733,393, filed on Sep. 19, 2018.

(30) Foreign Application Priority Data

Nov. 1, 2018 (KR) .................. 10-2018-0133064

(51) Int. Cl.
*A01K 7/02* (2006.01)

(52) U.S. Cl.
CPC .................... *A01K 7/02* (2013.01)

(58) Field of Classification Search
CPC . A01K 7/02; A01K 7/022; A01K 7/04; A01K 7/06; A01K 39/00; A01K 39/02;
(Continued)

(56) References Cited

U.S. PATENT DOCUMENTS 6,732,674 B2   5/2004 Gustin
7,270,082 B2 * 9/2007 Plante .................. A01K 7/022
119/74

(Continued)

FOREIGN PATENT DOCUMENTS

CN   101816289   9/2010
CN   203538079   4/2014

(Continued)

OTHER PUBLICATIONS

Chinese Office Action dated May 23, 2022 issued in Application No. 201980075867.4 (English translation attached).
(Continued)

*Primary Examiner* — Kristen C Hayes
(74) *Attorney, Agent, or Firm* — KED & ASSOCIATES, LLP

(57) ABSTRACT

A water supplier for a pet according to an embodiment of the present disclosure includes: a water tub being open upward and having a side wall; a pump installed in the water tub; a water supply pipe connected to the pump to deliver water; and a water supply plate disposed higher than the water tub, having a water supply hole communicating with the water supply pipe, and passing water supplied from the water supply hole, in which a floor plate of the water tub has a first drain.

20 Claims, 3 Drawing Sheets

(58) Field of Classification Search
CPC .......... A01K 7/005; A01K 7/00; A01K 7/025;
A01K 5/00; A01K 5/0291; B05B 17/08
See application file for complete search history.

(56) References Cited

U.S. PATENT DOCUMENTS

| | | |
|---|---|---|
| 10,165,753 B1 * | 1/2019 | Huang ................... A01K 7/02 |
| 11,026,398 B1 * | 6/2021 | Hoffman ................. A01K 7/00 |
| 2005/0166853 A1 * | 8/2005 | Plante ................. A01K 5/0114 |
| | | 119/74 |
| 2010/0095897 A1 | 4/2010 | Rowe |
| 2010/0170447 A1 * | 7/2010 | Pridgen, Jr. .......... A01K 5/0128 |
| | | 119/61.53 |
| 2013/0174790 A1 * | 7/2013 | Lipscomb ............... A01K 7/00 |
| | | 119/74 |
| 2021/0144963 A1 * | 5/2021 | Wang ...................... C02F 9/20 |

FOREIGN PATENT DOCUMENTS

| | | |
|---|---|---|
| JP | 2002-000104 | 1/2002 |
| JP | 2018-57339 | 4/2018 |
| KR | 20-0212891 | 2/2001 |
| KR | 20-0362970 | 9/2004 |

OTHER PUBLICATIONS

International Search Report dated Jan. 17, 2020 issued in Application No. PCT/KR2019/012182.
Japanese Office Action dated Apr. 19, 2022 issued in Application No. 2021-515195.

* cited by examiner

WATER SUPPLY DEVICE FOR PETS

CROSS-REFERENCE TO RELATED PATENT APPLICATIONS

This application is a U.S. National Stage Application under 35 U.S.C. § 371 of PCT Application No. PCT/KR2019/012182, filed Sep. 19, 2019, which claims priority to U.S. Provisional Patent Application Ser. No. 62/733,393, filed Sep. 19, 2018 and Korean Patent Application No. 10-2018-0133064, filed Nov. 1, 2018, whose entire disclosures are hereby incorporated by reference.

BACKGROUND OF THE DISCLOSURE

Field of the Disclosure

The present disclosure relates to a water supplier that provides drinking water to a pet and, more particularly, to a water supplier including a water tub, a pump pumping up water stored in the water tub, and a water supply plate disposed in the water tub and providing drinking water to a pet by receiving water pumped up by the pump.

Related Art

Recently, not only people who raise pets are increasing, and love and interest in pets are gradually increasing, so a lot of devices for pets are being developed.

Pets have to frequently drink water to maintain their biorhythm, but pets are left alone in many cases and have difficulty in communicating with human, so the demand for a water supplier that can supply water to pets is increasing.

The water supplier for a pet in the related art do not have a separate drain structure in a water tub keeping water, so it is required to turn over the water tub or laterally stand the water tub in order to remove the water in the water tub.

However, when there is a lot of water in the water tub, the weight is relatively large, so the old and weak or children have difficulty in turning over the water tub. Further, when old and weak or children turn over the water tub, they may drop the water tub to the floor, so the water tub may be broken or injure them.

Further, when the water tub is laterally stood with a lot of water therein, a large force is applied to the side of the water tub, so the side of the water tub may be cracked or broken.

SUMMARY

The objects of the present disclosure are as follows.

First, the present disclosure provides a water supplier for a pet that can safely discharge water stored in a water tub.

Second, the present disclosure provides a water supplier for a pet that can simply discharge water stored in a water tub.

The present disclosure has been made to solve all problems that may be generated or expected from the water suppliers for a pet according to the related art other than the objects described above.

In order to achieve the objects, a water supplier for a pet according to the present disclosure includes: a water tub being open upward and having a side wall; a pump installed in the water tub; a water supply pipe connected to the pump to deliver water; and a water supply plate disposed higher than the water tub, having a water supply hole communicating with the water supply pipe, and passing water supplied from the water supply hole. In particular, a floor plate of the water tub has a first drain.

Advantageous Effects

The effects of the water supplier for a pet according to the present disclosure having the configuration described above are as follows.

According to the present disclosure, since it is possible to simply discharge water stored in the water tub using only a small force that can incline the water supplier for a pet, even the old and the weak and children can safely discharge water in the water tub.

Further according to the water supplier for a pet of the present disclosure, it is possible to simply discharge water in a water tub without a complicated structure or a separate device.

DESCRIPTION OF EXEMPLARY EMBODIMENTS

Figure 1:
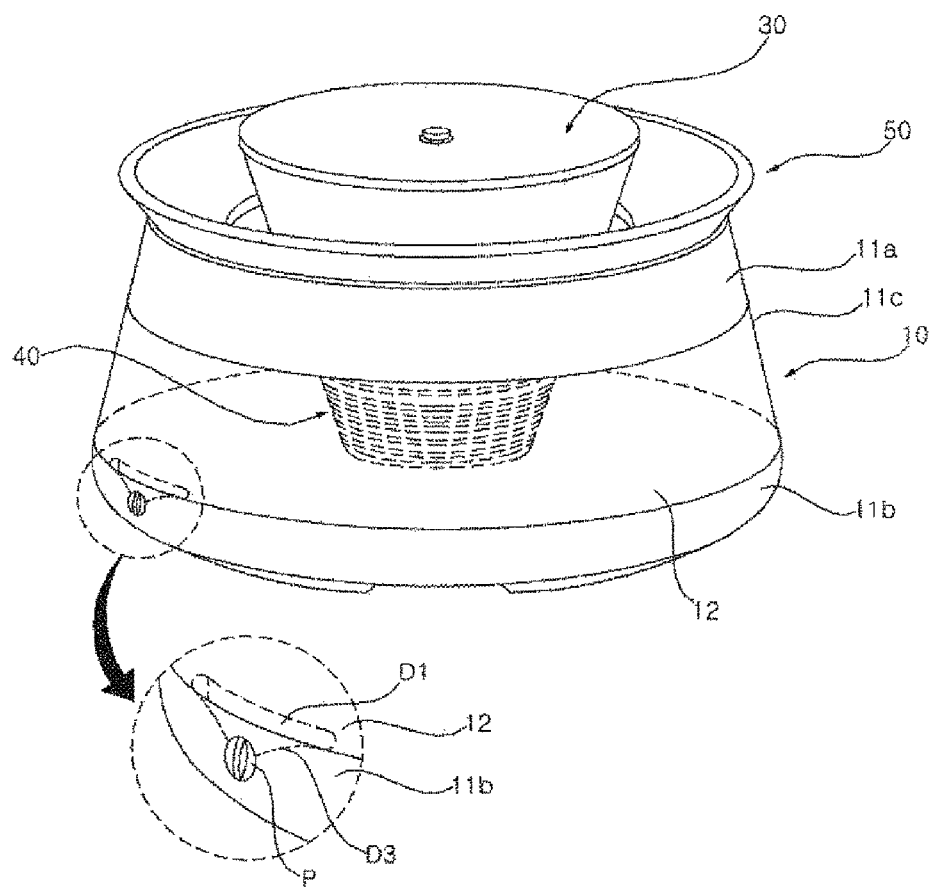
FIG. 1 is a perspective view and a partial enlarged view showing the external appearance of a water supplier for a pet according to an embodiment of the present disclosure.

The advantages, features, and method for achieving them of the present disclosure will be clear by referring to the embodiments to be described below. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims. Like reference numerals indicate the same components throughout the specification.

Thicknesses are enlarged to clearly show several layers and regions. However, the thicknesses of some layers and regions are exaggerated for the convenience of description.

When an element such as a layer, a film, a region, and a plate is "on" or "over" another component in the specification, it can be directly on the other element or intervening elements may be present therebetween. On the other hand, when an element is "directly on" another component, there is no object therebetween. When an element such as a layer, a film, a region, and a plate is "beneath" or "under" another component, it can be directly beneath the other element or intervening elements may be present therebetween. On the other hand, when an element is "directly under" another component, there is no object therebetween.

Hereafter, a drain structure will be described in detail while other components of a water supplier for a pet of the present disclosure is described with reference to FIGS. 1 to 3.

First, a circulation structure and a water tub of a water supplier for a pet according to an embodiment of the present disclosure are described with reference to FIGS. 1 and 2.

FIG. 1 is a perspective view and a partial enlarged view showing the external appearance of a water supplier for a pet according to an embodiment of the present disclosure.

Figure 2:
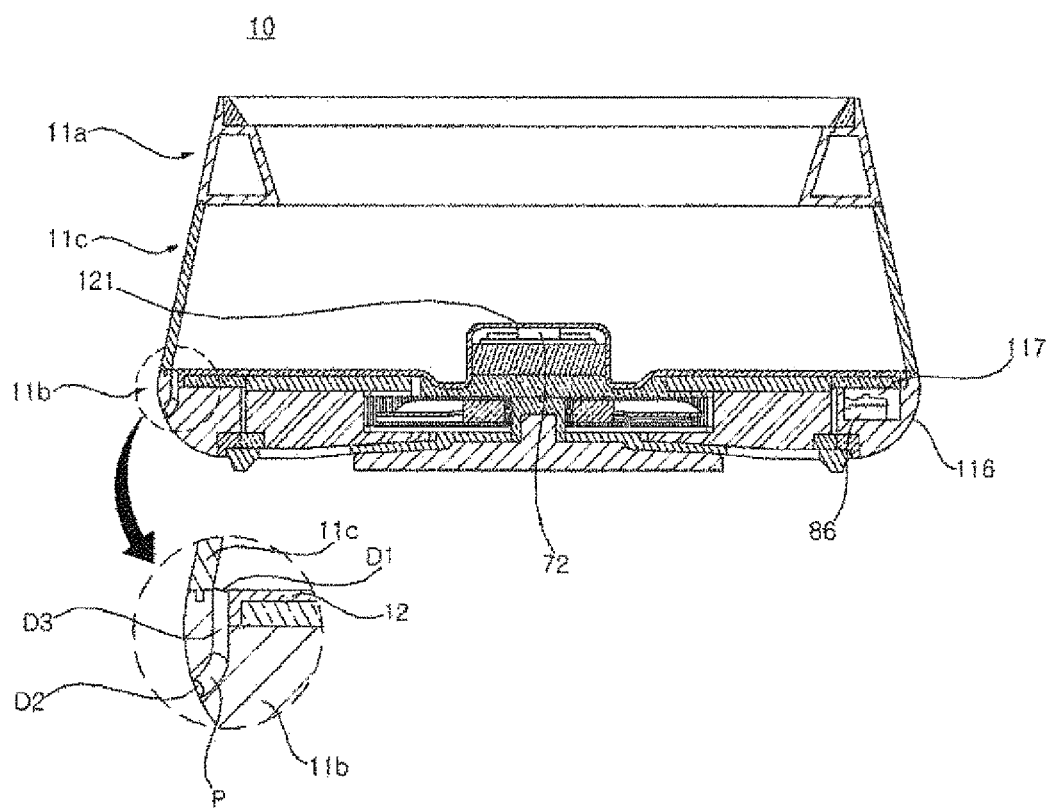
FIG. 2 is a cross-sectional view and a partial enlarged view of the water supplier for a pet shown in FIG. 1.

FIG. 2 is a cross-sectional view and a partial enlarged view of the water supplier for a pet shown in FIG. 1.

A water supplier for a pet of the present disclosure includes a water tub 10 storing water, a pump 20 installed in the water tub 10 and pumping up the water stored in the water tub 10, a water supply pipe 25 delivering water discharged from the pump 20, and a water supply plate 30 that water supplied from the water supply pipe 25 overflows.

Further, a water tray 50 receiving water dropping from the water supply plate 30 and discharging the water to the water tub 10 may be disposed between the water tub 10 and the water supply plate 30.

A filter 40 that filters out foreign substances in the water stored in the water tub before the water flows into the pump 20 may be installed in the water tub 10.

The water supplier for a pet according to an embodiment of the present disclosure may include a power supplier, a lighting device, a water level sensor, a water temperature sensor, a contamination sensor, a water temperature maintainer, a sterilization filter, etc.

Hereafter, the water tub included in an embodiment of the present disclosure is described in detail.

First, the water tub 10 is described with reference to FIGS. 1 and 2.

Figure 3:
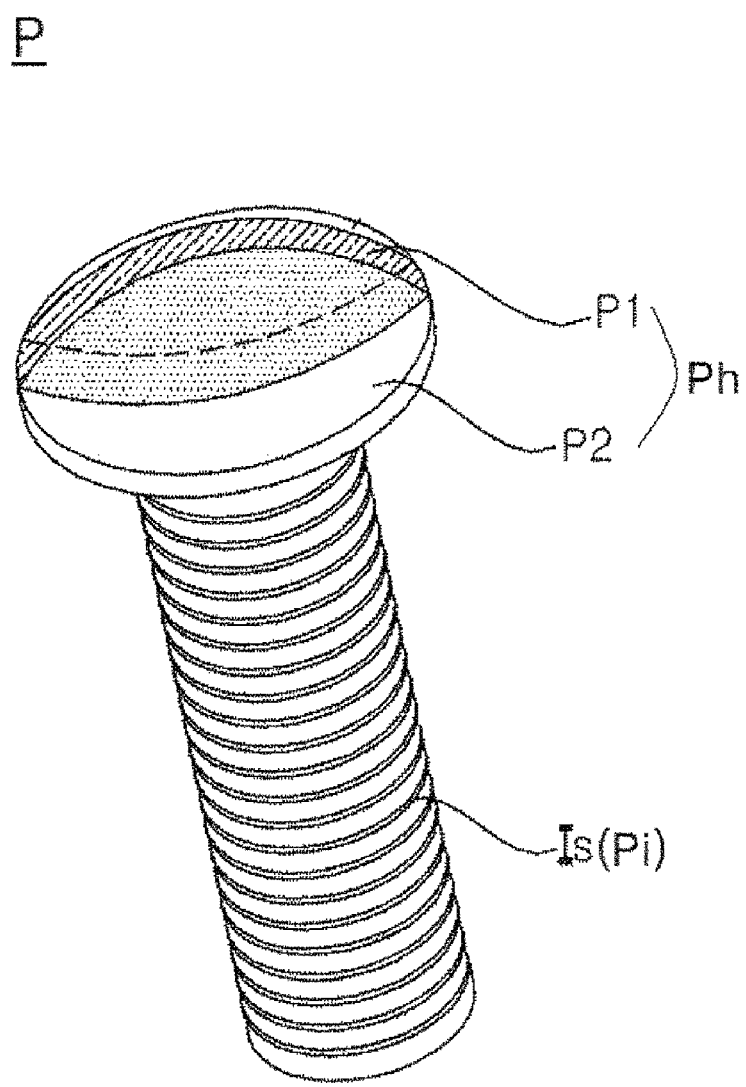
FIG. 3 is a perspective view of a drain cap included in the embodiment.

Referring to FIGS. 1 to 3, the water tub 10 may include a side wall 11 being open up and down and forming the side edge of the water tub, and a floor plate 12 disposed under the open bottom of the side wall 11. The side wall 11 may include a main side wall, and an upper side wall 11a and a lower edge wall 11b respectively coupled to the upper and lower portions of the main side wall.

The water tub 10 may be formed in a cylindrical shape tapered upward such that the inner diameter gradually decreases upward, as in an embodiment of the present disclosure, but is not limited thereto and may be formed in various shapes. When the water tub 10 is tapered upward, the water tub 10 can perform the function thereof while stably maintaining the position without overturning even if external shock of considerable magnitude is applied to the water tub 10.

A protrusion 121 having a cylindrical shape and being convex upward may be formed at the center of the floor plate 12, a wireless power receiver 72 may be installed in the space inside the protrusion 121 when seen from the bottom of the floor plate 12, and the floor plate 12 may be integrated with the side wall 11 or may be separately formed and integrated with the main side wall 11.

The side wall 11 may be integrally made of the same material as the main side wall 11C, the upper side wall 11a, and the lower edge wall 11b, or they may be made of different materials and then integrally combined. The upper side wall 11a and the lower edge wall 11b may be selectively made of various materials having an excellent aesthetic feeling, and the main side wall 11C may be made of a transparent material so that the amount of water in the water tub 10 can be recognized from the outside.

The lower edge wall 11b may have an outer circumferential surface rounding and extending downward from the lower edge of the main side wall 1C and the edge surface 117 may protrude from the upper portion of the outer circumferential surface 116 toward the center of the water tub to have a predetermined width.

Accordingly, the outer circumferential surface 116 has the edge surface having a predetermined area overlapping the edge of the floor plate 12 and a water level sensor 86, etc. may be installed on the edge surface 117.

As described above, according to the water supplier for a pet of the present disclosure, the water tub 10 fundamentally stores water, so it is possible to continuously provide water to a pet while supplying and circulating the stored water.

Next, a drain structure that can discharge the water stored in the water tub 10 is described.

When the water supplier for a pet is used, contaminants may be included in water or it should be possible to discharge the water stored in the water tub in order to wash the inside the water tub.

However, there is no separate drain structure in the water suppliers for a pet in the related art, so it is required to turn over or laterally stand a water tub having an opening in order to throw out the water therein. In this case, not only the weight of the water tub itself, but the weight of the water stored in the water tub are applied, so the weight of the entire supplier may be considerable.

Accordingly, when the old and the weak or children turn over the water tub, they may drop the water tub, so the water tub is damaged or they are injured in many cases. Further, when the water tub is laterally stood, a large force is instantaneously applied to the side of the water tub, so the side of the water tub is cracked or broken, if severe, in many cases.

However, the water supplier for a pet according to the present disclosure has a drain structure having a first drain D1 in the floor plate and a second drain D2 in the lower edge wall of the water tub, so it is possible to safely and easily discharge water.

The drain structure is described in detail with reference to FIGS. 1 and 2.

In an embodiment of the present disclosure, it is possible to discharge the water stored in the water tub through the drains by lifting only one side of the water tub from the floor.

In detail, the floor plate of the water tub has the first drain D1 in an embodiment of the present disclosure. That is, the first drain D1 is formed in the floor plate without a drain in the main side wall, etc. of the water tub, whereby water can be quickly discharged.

In more detail, the first drain D1 may be formed at the edge of the floor plate adjacent to the side wall. As described above, when a side of the water tub parallel with the floor is lifted, the water collects to the portion being in contact with the ground by gravity and the first drain D1 is formed at the portion, so the collecting water can be discharged.

Accordingly, since the first drain D1 is formed at the edge of the floor plate adjacent to the side wall, the water stored in the water tub can be simply collected and the collected water can be discharged through the first drain D1.

The meaning of "adjacent" in the specification of the present disclosure means not a specific distance from the side wall, but the edge of the floor plate being in contact with the side wall.

Since water collect to the tangential line of the side wall and the floor plate with the water tub inclined, the drain should be formed close to the tangential line of the side wall and the floor plate in order to maximally discharge the water stored in the water tub.

Accordingly, at least a portion of the shape of the first drain D1 according to an embodiment of the present disclosure may be the same as the shape of the edge of the floor plate.

In detail, since the first drain D1 is formed, including the tangential line where the side wall and the floor plate meet each other, at least a portion of the shape of the first drain D1 may be the same as the shape of the edge of the floor plate.

That is, the shape of the first drain D1 may be the shape of a virtual floor plate edge to be extended when there is no remaining edge shape of the floor plate and first drain D1.

Further, the detailed shape of the first drain D1 is not limited to the shape shown in the figures, and may include geometrical, non-fixed, and 3-dimensinoal shapes.

Due to the position and shape of the first drain D1, the water collected at the first drain D1 in the inclined water tub can be moved to the first drain D1 without remaining at other portions.

The water collected at the first drain D1 can be discharged through the second drain D2 formed in the side wall.

In detail, as described above, the side wall includes a main side wall, an upper side wall positioned over the main side wall, and a lower edge wall positioned under the main side wall, and the second drain D2 may be formed in the lower edge wall.

According to an embodiment of the present disclosure, the floor plate including the first drain D1 is disposed between the main side wall and the lower edge wall, and the second drain D2 is positioned in the lower edge wall that is relatively low, so water can be discharged by gravity without a separate device or complicated structure.

Further, in the water supplier for a pet according to an embodiment of the present disclosure, the width of the first drain D1 is larger than the width of the second drain D2, so water can be quickly discharged.

In detail, the first drain D1 through which water flows inside has a large width and a large area through which water moves, so a lot of water can flow inside. The second drain D2 has a relatively small width, so the area through which water moves is small, and accordingly, water flowing in the first drain D1 is quickly discharged outside.

The widths of the first and second drains D2 do not means the distance between specific points and may mean the longest straight line of straight lines crossing the first and second drains D2. Further, the fact that the width of the first drain D1 is larger than the width of the second drain D2 may be analyzed as meaning that the area of the first drain D1 is larger than the area of the second drain D2.

The first drain D1 and the second drain D2 are connected by a drain pipe D3, so water can be discharge. The drain pipe D3 may have a cylindrical shape connecting the first drain D1 and the second drain D2.

However, the shape of the drain pipe D3 is not limited to that described herein and shown in the figures, and may include the range that can be applied to the shape of the drain pipe D3 by those skilled in the art.

For example, a non-fixed curve including at least one curvature may be applied to a portion of the drain pipe D3.

Next, the drain cap P is described in detail with reference to FIGS. 2 and 3.

Since the water flowing inside through the first drain D1 is discharged to the outside through the second drain D2, the drain cap P is fitted to the second drain D2 when water is not discharged, thereby preventing drain.

That is, it is possible to open and close the second drain D2 by inserting and pulling the drain cap P into and out of the second drain D2.

The drain cap P may have a insertion Pi that is inserted into the drain pipe D3 and a groove Ph formed at an end of the insertion Pi.

The groove Ph and the insertion Pi are integrated, and the width of the insertion Pi is larger than the width of the groove Ph. Accordingly, when the insertion Pi is inserted up to the end inside the drain, the groove Ph covers the second drain D2, whereby the water in the water tub is not discharged outside.

A spiral groove Is is formed on the side of the insertion Pi, the insertion Pi can be stably inserted into the drain pipe D3 and can cover the drain pipe D3. That is, a spiral groove Is is formed on the inner surface of the drain pipe D3 to correspond to the spiral groove Is formed on the side of the insertion Pi, so the insertion P is can be fixed in the drain pipe D3 and water can be prevented from leaking by blocking the space between the drain pipe D3 and the insertion Pi.

However, the side structure of the insertion Pi coupled to the drain pipe D3 is not limited to the above description and the shape shown in the figures, and may include the range that can be easily changed by those skilled in the art as long as it is possible to prevent leakage of water and keep the coupling state by inserting the insertion in the drain pipe D3.

The groove Ph covering the second drain D2 by the insertion Pi, as described above, may have a center P1 protruding outward and crossing the groove Ph and a recession P2 recessed inward from the edge of the groove Ph to the center P1.

That is, it is possible to insert the insertion Pi into the drain pipe D3 by holding and rotating the center P1 formed between the recessions P2 with fingers.

Further, the edge of the groove Ph may coincide with the edge of the second drain D2 and the curvature of the center P1 may coincide with the curvature of the lower edge wall.

In detail, when the drain cap P is fully inserted into the second drain D3, the edge of the second drain D2 and the edge of the recession P2 are fitted to each other, thereby preventing the recession P2 from protruding outward further than the second drain D2. Further, since the edge of the center P1 is fitted to the edge of the lower edge wall, there is no portion protruding outward from the lower edge wall.

Accordingly, after the drain cap P is inserted and fixed in the water tub, the drain cap P does not partially protrude from the lower edge wall and the shape of the lower edge wall is maintained, so a visual aesthetic feeling can be achieved.

Although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

What is claimed is:

1. A water supplier for a pet, the water supplier comprising:
   a water tub being open upward and having a side wall;
   a pump installed in the water tub;
   a water supply pipe connected to the pump to deliver water; and
   a water supply plate disposed higher than the water tub, having a water supply hole communicating with the water supply pipe, and passing water supplied from the water supply hole,
   wherein the side wall includes:
      a main side wall;
      an upper side wall positioned over the main side wall; and
      a lower side wall positioned under the main side wall, and wherein a floor plate of the water tub has a first drain, and the lower side wall has a second drain.

2. The water supplier of claim 1, wherein the first drain is formed at an edge of the floor plate adjacent to the side wall.

3. The water supplier of claim 2, wherein a shape of the first drain matches a shape of the edge of the floor plate.

4. The water supplier of claim 1, wherein a width of the first drain is larger than a width of the second drain.

5. The water supplier of claim 1, further comprising a drain pipe connecting the first drain and the second drain.

6. The water supplier of claim 5, wherein a width of the first drain is greater than a width of the second drain, and the drain pipe includes a curvature between the first drain and the second drain.

7. The water supplier of claim 5, further comprising a drain cap opening and closing the second drain.

8. The water supplier of claim 7, wherein
the drain cap has:
an insertion extension being inserted into the drain pipe; and
a groove head formed at an end of the insertion extension, and
the groove head has:
a center protrusion protruding outward and crossing the groove head; and
at least one recession recessed inward from an edge of the groove head to the center protrusion.

9. The water supplier of claim 8, wherein a spiral groove is formed on the insertion extension.

10. The water supplier of claim 9, wherein a spiral groove is formed on an inner surface of the drain pipe and is configured to receive the spiral groove of the insertion extension.

11. The water supplier of claim 8, wherein the edge of the groove head matches an edge of the second drain, and a curvature of the center protrusion matches a curvature of the lower edge wall.

12. The water supplier of claim 8, wherein a width of the groove head is greater than a width of the insertion extension.

13. The water supplier of claim 1, wherein an area of the first drain is greater than an area of the second drain.

14. The water supplier of claim 1, wherein the floor plate is inclined downward toward the first drain.

15. The water supplier of claim 1, wherein the first drain is positioned higher than the second drain.

16. The water supplier of claim 1, wherein the main side wall is made of a transparent material.

17. The water supplier of claim 16, wherein at least one of the upper side wall or the lower side wall is made of a different material from that of the main side wall.

18. The water supplier of claim 1, wherein the water tub is formed in a cylindrical shape that is tapered upward such that an inner diameter of the water tub gradually decreases upward.

19. The water supplier of claim 1, wherein the lower side wall includes:
an edge surface overlapping the floor plate in vertical direction; and
an outer circumferential surface extending downward and radially inward from the edge surface.

20. The water supplier of claim 1, further comprising a water level sensor provided on the lower side wall.

* * * * *